(12) United States Patent
Slayter et al.

(10) Patent No.: US 12,098,764 B2
(45) Date of Patent: Sep. 24, 2024

(54) SHROUD WITH INTEGRATED LUBE JETS

(71) Applicant: Hamilton Sundstrand Corporation, Charlotte, NC (US)

(72) Inventors: Matthew Allen Slayter, Rockford, IL (US); James Vandung Nguyen, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 148 days.

(21) Appl. No.: 17/688,123

(22) Filed: Mar. 7, 2022

(65) Prior Publication Data

US 2023/0279942 A1  Sep. 7, 2023

(51) Int. Cl.
*F16H 57/04* (2010.01)

(52) U.S. Cl.
CPC ....... *F16H 57/0423* (2013.01); *F16H 57/046* (2013.01); *F16H 57/0471* (2013.01); *F16H 57/0495* (2013.01)

(58) Field of Classification Search
CPC ............... F16H 57/0423; F16H 57/046; F16H 57/0471; F16H 57/0495
See application file for complete search history.

(56) References Cited

U.S. PATENT DOCUMENTS

| | | | |
|---|---|---|---|
| 5,048,370 A * | 9/1991 | Duello | F16H 57/0423 74/606 R |
| 5,699,877 A * | 12/1997 | Dreier | F16N 7/26 184/11.2 |
| 6,374,951 B1 | 4/2002 | Michelhaugh et al. | |
| 8,870,699 B2 | 10/2014 | Lewis et al. | |
| 8,944,216 B2 | 2/2015 | Rollins et al. | |
| 9,879,773 B2 | 1/2018 | Slayter et al. | |
| 9,989,143 B2 | 6/2018 | Fomison | |
| 10,077,715 B2 | 9/2018 | Viel et al. | |
| 10,378,640 B2 * | 8/2019 | Kaemmerer | F16H 57/0436 |
| 10,598,044 B2 | 3/2020 | Bauduin et al. | |

(Continued)

FOREIGN PATENT DOCUMENTS

| | | |
|---|---|---|
| DE | 102009052595 A1 | 5/2011 |
| EP | 1767814 B1 | 5/2008 |
| WO | 9105965 A1 | 5/1991 |

OTHER PUBLICATIONS

Search Report issued in European Patent Application No. 23160411.7; Application Filing Date Mar. 7, 2023; Date of Mailing May 3, 2023 (8 pages).

*Primary Examiner* — Jake Cook
(74) *Attorney, Agent, or Firm* — CANTOR COLBURN LLP

(57) ABSTRACT

A shroud is provided and includes first and second curved sections, at least one of which defines a main interior channel and at least one of first and second lube jet sections integrated with the first and second curved sections. The first lube jet section includes a summit at which proximal portions of the first and second curved sections meet and defines a first jetting interior channel fluidly communicative with the main interior channel and terminating at the summit. The second lube jet section includes an elongate member extending from one of the first and second curved sections and defines a second jetting interior channel fluidly communicative with the main interior channel and terminating at a distal end of the elongate member.

20 Claims, 3 Drawing Sheets

(56) References Cited

U.S. PATENT DOCUMENTS

| | | |
|---|---|---|
| 10,619,567 B2 | 4/2020 | Roever |
| 10,746,283 B2 | 8/2020 | Anglin |
| 10,955,041 B2 | 3/2021 | Smith |
| 11,125,316 B2 | 9/2021 | Carmean et al. |
| 11,174,756 B2 | 11/2021 | Venter et al. |
| 11,174,796 B2 | 11/2021 | Bewick et al. |
| 2011/0214947 A1 | 9/2011 | Tuomas |
| 2013/0025405 A1 | 1/2013 | Arisawa et al. |
| 2014/0054114 A1* | 2/2014 | Isomura .............. F16H 57/0457 184/6.12 |
| 2017/0370288 A1 | 12/2017 | Uhkoetter |
| 2019/0003570 A1 | 1/2019 | Graves et al. |

\* cited by examiner

SHROUD WITH INTEGRATED LUBE JETS

BACKGROUND

The present invention relates to a shroud with integrated lube jets and, more particularly, to a shroud with integrated lube jets for use in a gearbox.

A gearbox is a component of a drive system in a vehicle of any time (ground-based or aircraft). A typical gearbox includes one or more input shafts, one or more output shafts and gearing. The gearing is operably coupled between the one or more input shafts and the one or more output shafts whereby rotation of the one or more input shafts can be transmitted to the one or more output shafts. In many cases, the gearing can be provided to change the gear ratio between the one or more input shafts and the one or more output shafts. This gear ratio can be adjustable and/or selectable.

Gearboxes often require shrouds and lube jets. Shrouds are useful in protecting lubrication flow in gearbox sump areas and in reducing power loss by managing windage. Protecting lubrication flow is particularly helpful at mesh points where gears mesh with one another. The lube jets are positioned to direct a jet of lubrication fluid at or near the meshing gears to prevent overheating and damage.

In conventional gearboxes, the shrouds and lube jets are separate components and are not combined due to costs and general construction history. However, since separate shrouds and lube jets each have their own associated machining costs, extra hardware, o-rings, etc., the overall costs, complexities and weights of gearboxes can all be high. Moreover, in some cases, a shape of the shroud in a gearbox might be compromised to allow for a nearby lube jet to have access to the corresponding gears.

BRIEF DESCRIPTION

According to an aspect of the disclosure, a shroud is provided and includes first and second curved sections, at least one of which defines a main interior channel and at least one of first and second lube jet sections integrated with the first and second curved sections. The first lube jet section includes a summit at which proximal portions of the first and second curved sections meet and defines a first jetting interior channel fluidly communicative with the main interior channel and terminating at the summit. The second lube jet section includes an elongate member extending from one of the first and second curved sections and defines a second jetting interior channel fluidly communicative with the main interior channel and terminating at a distal end of the elongate member.

In accordance with additional or alternative embodiments, the first and second curved sections are disposable proximate to meshing gears within a gearbox.

In accordance with additional or alternative embodiments, the first and second curved sections have respective curvatures that conform to curvatures of the meshing gears.

In accordance with additional or alternative embodiments, the main interior channel is chargeable with lubricant whereby the lubricant is communicated into and through the at least one of the first and second jetting interior channels.

In accordance with additional or alternative embodiments, the first lube jet section defines an inwardly facing aperture at the summit at which the first jetting interior channel terminates and the lubricant is communicated into and through the first jetting interior channel at sufficient pressure to form a longitudinal lubricant jet upon exiting the inwardly facing aperture.

In accordance with additional or alternative embodiments, the second lube jet section defines a laterally facing aperture at the distal end at which the second jetting interior channel terminates and the lubricant is communicated into and through the second jetting interior channel at sufficient pressure to form a sidelong lubricant jet upon exiting the laterally facing aperture.

In accordance with additional or alternative embodiments, the shroud further includes mountings by which the first and second curved sections are mountable to a housing.

In accordance with additional or alternative embodiments, the shroud further includes plugs to plug open ends of the main interior channel and the at least one of the first and second jetting interior channels.

According to an aspect of the disclosure, a gearbox is provided and includes a housing, meshing gears and a shroud. The shroud includes first and second curved sections supported on the housing, at least one of which defines a main interior channel and at least one of first and second lube jet sections integrated with the first and second curved sections. The first lube jet section includes a summit proximate to a meshing of the meshing gears at which proximal portions of the first and second curved sections meet and defines a first jetting interior channel fluidly communicative with the main interior channel and terminating at the summit. The second lube jet section includes an elongate member extending toward a bearing of one of the meshing gears from one of the first and second curved sections and defines a second jetting interior channel fluidly communicative with the main interior channel and terminating at a distal end of the elongate member.

In accordance with additional or alternative embodiments, the first and second curved sections have respective curvatures that conform to curvatures of the meshing gears.

In accordance with additional or alternative embodiments, the main interior channel is chargeable with lubricant whereby the lubricant is communicated into and through the at least one of the first and second jetting interior channels.

In accordance with additional or alternative embodiments, the first lube jet section defines an inwardly facing aperture at the summit at which the first jetting interior channel terminates and the lubricant is communicated into and through the first jetting interior channel at sufficient pressure to form a longitudinal lubricant jet that impinges on the meshing of the meshing gears upon exiting the inwardly facing aperture.

In accordance with additional or alternative embodiments, the second lube jet section defines a laterally facing aperture at the distal end at which the second jetting interior channel terminates and the lubricant is communicated into and through the second jetting interior channel at sufficient pressure to form a sidelong lubricant jet that impinges on the bearing of the one of the meshing gears upon exiting the laterally facing aperture.

In accordance with additional or alternative embodiments, the shroud further includes mountings by which the first and second curved sections are mountable to the housing.

In accordance with additional or alternative embodiments, the shroud further includes plugs to plug open ends of the main interior channel and the at least one of the first and second jetting interior channels.

According to an aspect of the disclosure, a shroud forming method is provided and includes selecting a gearbox design in which a shroud is to be installed, the gearbox design comprising a gears, bearings and rotation shafts of the gears and a housing in which the gears, bearings and rotation shafts are disposed, identifying space between the housing and the gears, bearings and rotation shafts, identifying locations of the gears, bearings and rotation shafts at which lubrication is warranted, designing the shroud for installation within the space such that the shroud comprises a body and lube jet sections for suppling lubricant to the locations integrated with the body and assembling the shroud such that the body and the lube jet sections define interior channels for the lubricant.

In accordance with additional or alternative embodiments, the method further includes mounting the shroud to the housing and charging the interior channels with the lubricant.

In accordance with additional or alternative embodiments, the assembling of the shroud includes additive manufacturing.

In accordance with additional or alternative embodiments, the assembling of the shroud includes one of casting and brazing.

In accordance with additional or alternative embodiments, the assembling of the shroud further includes drilling the interior channels and plugging open ends of the interior channels.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The following descriptions should not be considered limiting in any way. With reference to the accompanying drawings, like elements are numbered alike.

DETAILED DESCRIPTION

As will be described below, a shroud with an integrated lube jet is provided for use in, for example, a gearbox of a vehicle such as an aircraft. In some cases, the shroud can include multiple integrated lube jets. In any case, the shroud with the integrated lube jet(s) is provided as a single component that is attached to a housing and can be positioned at or very near to gears. The single component can be built or assembled by various processes including, but not limited to, additive manufacturing, casting and/or brazing.

Figure 1:
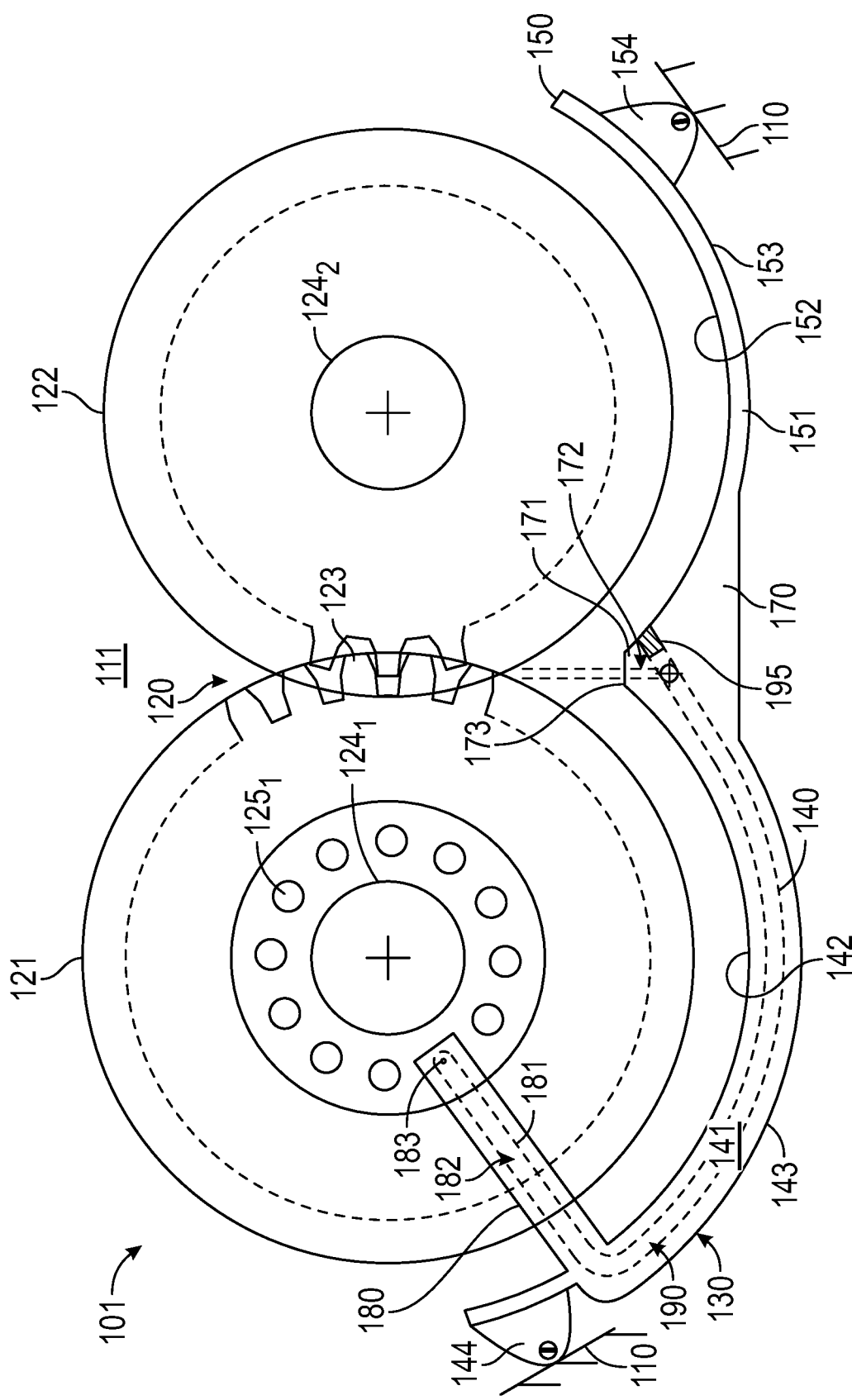
FIG. 1 is a schematic top-down view of a gearbox with meshing gears and a shroud with integrated lube jets in accordance with embodiments.
Figure 2:
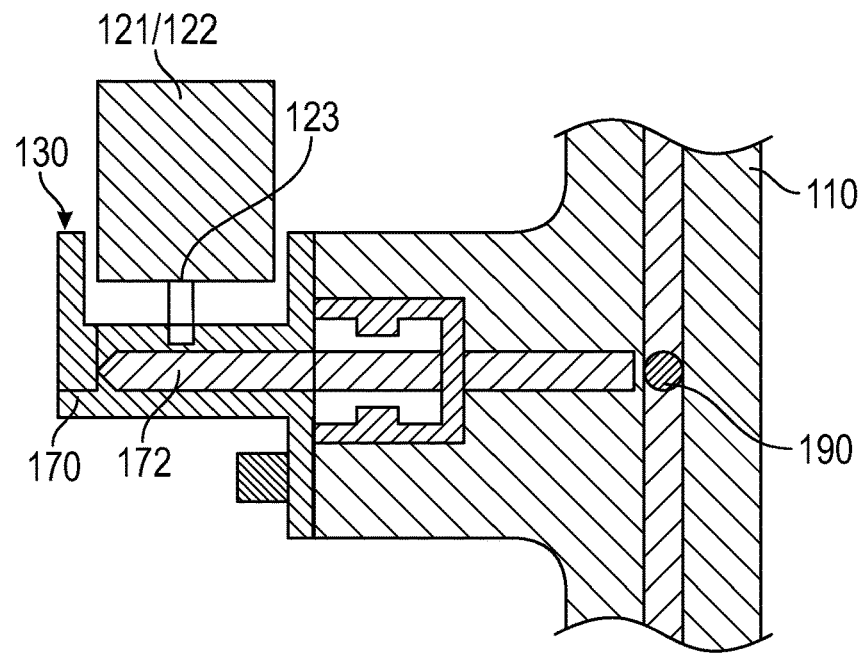
FIG. 2 is a schematic side view of the meshing gears, the shroud and one of the integrated lube jets of FIG. 1 in accordance with embodiments.
Figure 3:
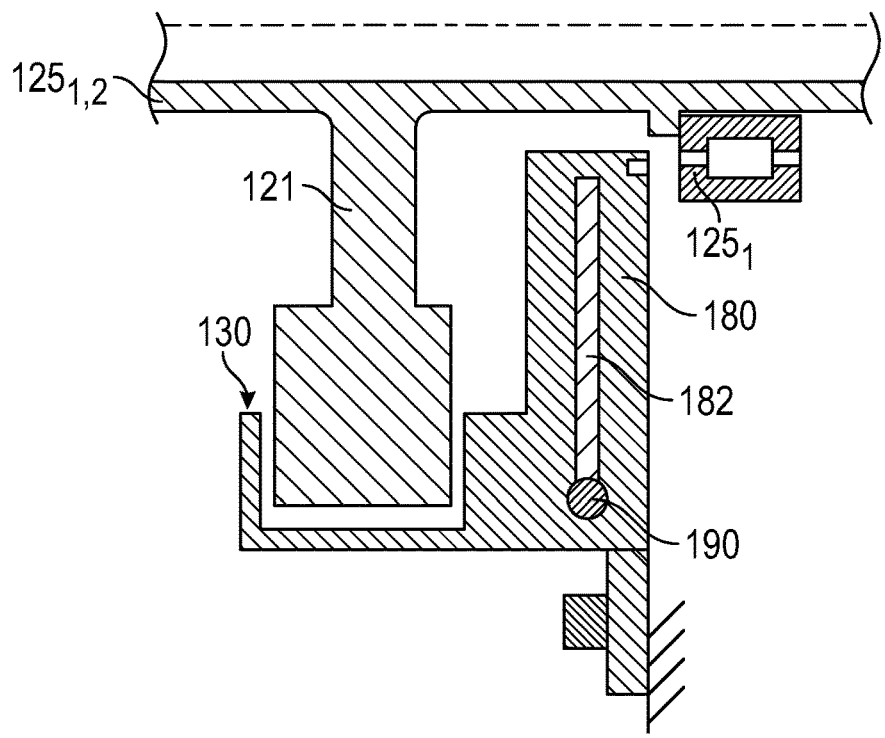
FIG. 3 is a schematic side view of one of the meshing gears, the shroud and one of the integrated lube jets of FIG. 1 in accordance with embodiments.

With reference to FIGS. 1-3, a gearbox 101 is provided and includes a housing 110 that is formed to define an interior 111, meshing gears 120 and a shroud 130. The meshing gears 120 can include at least a first meshing gear 121 and a second meshing gear 122 that mesh with one another at a meshing location 123. The first and second meshing gears 121 and 122 are each rotatable about respective rotational axes defined along rotation shafts $124_1$, $124_2$ and the first and second meshing gears 121 and 122 are supported by respective bearings (not shown). At least the meshing location 123 and at least one of the rotation shafts $124_1$, $124_2$ and the bearings $125_1$, $125_2$ require lubricant. The shroud 130 protects lubrication flow in gearbox sump areas and reduces power loss by managing windage. The shroud 130 includes integrated lube jets by which lubricant is supplied to satisfy requirements of the meshing location 123 and the at least one of the rotation shafts $124_1$, $124_2$ and the bearings $125_1$, $125_2$.

The shroud 130 can be disposed within the interior 111 at a location proximate to the first and second meshing gears 121 and 122. The shroud 130 includes a first curved section 140 and a second curved section 150. The shroud 130 can further include at least one of a first lube jet section 170 and a second lube jet section 180. The following description will relate to the cases in which the first curved section 140 corresponds to the first meshing gear 121, the second curved section 150 corresponds to the second meshing gear 122 and the shroud includes both the first lube jet section 170 and the second lube jet section 180. This is being done for purposes of clarity and brevity and should not be interpreted as limited the overall scope of the application in any way.

In accordance with embodiments, the first curved section 140 can generally wrap around the first meshing gear 121 and has a curvature that generally mimics the curvature of an outer surface of the first meshing gear 121. The first curved section 140 includes a body 141 with an interior facing surface 142 that faces the first meshing gear 121 at a relatively small distance and an outwardly facing surface 143 that faces the housing 110. The outwardly facing surface 143 can be mounted to the housing 110 by way of a first mounting 144.

In accordance with similar embodiments, the second curved section 150 can generally wrap around the second meshing gear 122 and has a curvature that generally mimics the curvature of an outer surface of the second meshing gear 122. The second curved section 150 includes a body 151 with an interior facing surface 152 that faces the second meshing gear 122 at a relatively small distance and an outwardly facing surface 153 that faces the housing 110. The outwardly facing surface 153 can be mounted to the housing 110 by way of a second mounting 154.

At least one of the body 141 of the first curved section 140 and the body 151 of the second curved section 150 is formed to define a main interior channel 190.

The following description will relate to the cases in which the first lube jet section 170 is integrated into or with the first and second curved sections 140 and 150, in which the second lube jet section 180 is integrated into or with the first curved section 140 and in which the body 141 of the first curved section 140 is formed to define the main interior channel 190. This is being done for purposes of clarity and brevity and should not be interpreted as limited the overall scope of the application in any way.

The first lube jet section 170 includes a summit 171 that is proximate to the meshing location 123. The summit 171 is formed by proximal portions of the first and second curved sections 140 and 150 meeting or coming together in an integral manner so that the bodies 141 and 151 of the first and second curved sections 140 and 150 and the summit 171 combine to form a unitary or monolithic component. The first lube jet section 170 is formed to define a first jetting interior channel 172 and an inwardly facing aperture 173 at an end or innermost part of the summit 171. The first jetting interior channel 172 is fluidly communicative with the main interior channel 190 and terminates at the inwardly facing aperture 173 at the end or innermost part of the summit 171.

The second lube jet section 180 includes an elongate member 181 that extends integrally from the interior facing surface 142 toward the bearing 125₁ so that the body 141 of the first curved section 140 and the elongate member 181 combine to form a unitary or monolithic component. The second lube jet section 180 is formed to define a second jetting interior channel 182 and a laterally facing aperture 183 at or near a distal end of the elongate member 181. The second jetting interior channel 180 is fluidly communicative with the main interior channel 190 and terminates at the laterally facing aperture 183 at or near the distal end of the elongate member 181.

With the configurations described above, when the main interior channel 190 is chargeable with the lubricant, the lubricant can be communicated into and through the first and second jetting interior channels 172 and 182 at sufficient pressure to form a longitudinal lubricant jet that impinges on and thus lubricates the meshing location 123 upon exiting the inwardly facing aperture 173 and to form a sidelong lubricant jet that impinges on and thus lubricates the bearing 125₁ upon exiting the laterally facing aperture 183.

In accordance with embodiments, plugs 195 can be provided to plug open ends of the main interior channel 190 and the first and second jetting interior channels 172 and 182.

Figure 4:
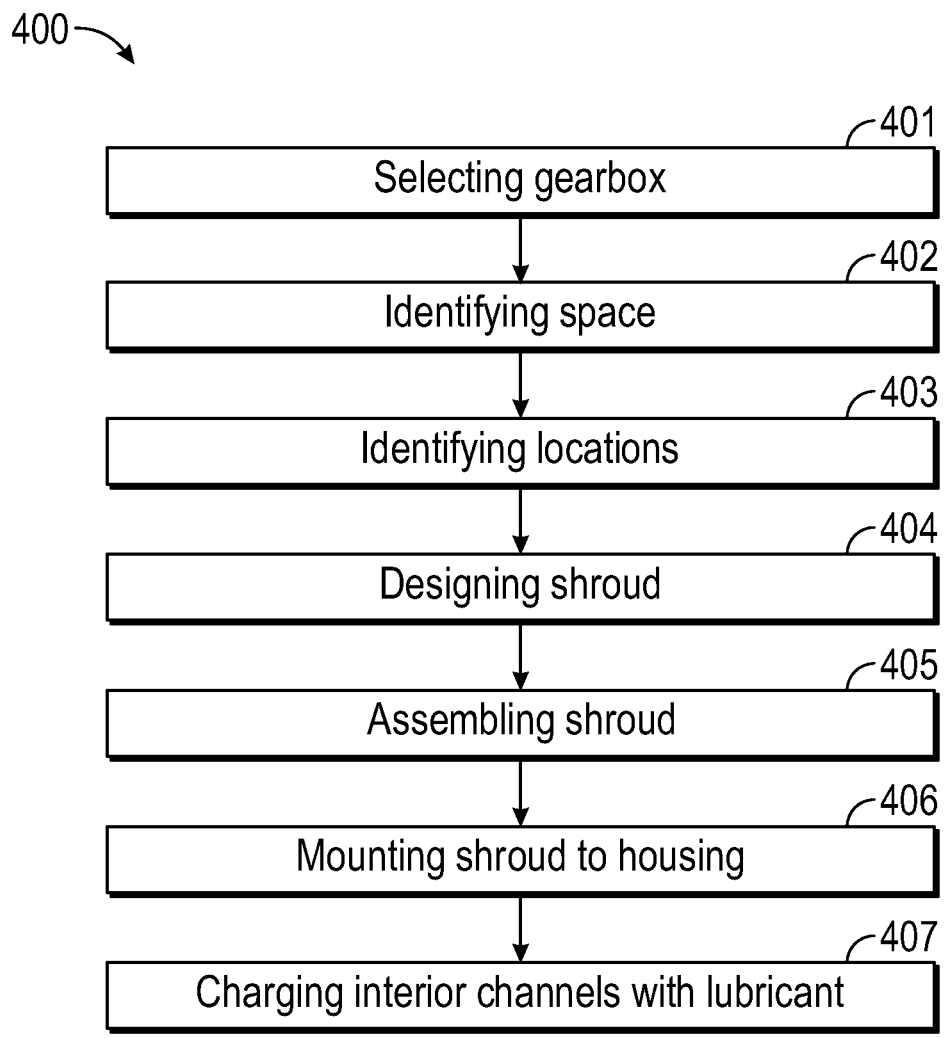
FIG. 4 is a flow diagram illustrating a shroud forming method in accordance with embodiments.

With reference to FIG. 4, a shroud forming method 400 is provided. The shroud forming method 400 includes selecting a gearbox design in which a shroud is to be installed, the gearbox design including a gears, bearings and rotation shafts of the gears and a housing in which the gears, bearings and rotation shafts are disposed (block 401), identifying space between the housing and the gears, bearings and rotation shafts (block 402), identifying locations of the gears, bearings and rotation shafts at which lubrication is warranted (block 403), designing the shroud for installation within the space such that the shroud includes a body and lube jet sections for suppling lubricant to the locations integrated with the body (block 404) and assembling the shroud such that the body and the lube jet sections define interior channels for the lubricant (block 405). The assembling of block 405 can include additive manufacturing (in which the forming of the interior channels occurs simultaneously with the building of the shroud) or by some combination of casting and brazing or other similar processes (with the interior channels subsequently formed by drilling and plugging of open ends). The shroud forming method 400 can also include mounting the shroud to the housing (block 406) and charging the interior channels with the lubricant (block 407).

Technical effects and benefits of the present disclosure provide for the formation of the shroud of a gearbox with the integrated lube jet(s) in a single component. This allows for an optimized shroud shape and reduced costs and assembly times along with reduced housing core counts, piece part counts, o-ring counts and fastener counts.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A shroud, comprising:
   first and second curved sections, at least one of which defines a main interior channel; and
   at least one of first and second lube jet sections integrated with the first and second curved sections,
   the first lube jet section comprising a summit at which proximal portions of the first and second curved sections meet and defining a first jetting interior channel fluidly communicative with the main interior channel and terminating at the summit,
   the second lube jet section comprising an elongate member extending from one of the first and second curved sections and defining a second jetting interior channel fluidly communicative with the main interior channel and terminating at a distal end of the elongate member, and
   at least one of:
   the first lube jet section defines an inwardly facing aperture at the summit at which the first jetting interior channel terminates, and
   the second lube jet section defines a laterally facing aperture at the distal end at which the second jetting interior channel terminates.

2. The shroud according to claim 1, wherein the first and second curved sections are disposable proximate to meshing gears within a gearbox.

3. The shroud according to claim 2, wherein the first and second curved sections have respective curvatures that conform to curvatures of the meshing gears.

4. The shroud according to claim 1, wherein the main interior channel is chargeable with lubricant whereby the lubricant is communicated into and through the at least one of the first and second jetting interior channels.

5. The shroud according to claim 4, wherein the lubricant is communicated into and through the first jetting interior channel at sufficient pressure to form a longitudinal lubricant jet upon exiting the inwardly facing aperture.

6. The shroud according to claim 4, wherein the lubricant is communicated into and through the second jetting interior channel at sufficient pressure to form a sidelong lubricant jet upon exiting the laterally facing aperture.

7. The shroud according to claim 1, further comprising mountings by which the first and second curved sections are mountable to a housing.

8. The shroud according to claim 1, further comprising plugs to plug open ends of the main interior channel and the at least one of the first and second jetting interior channels.

9. A gearbox, comprising:
   a housing;

meshing gears; and a shroud, comprising:
first and second curved sections supported on the housing, at least one of which defines a main interior channel; and at least one of first and second lube jet sections integrated with the first and second curved sections, the first lube jet section comprising a summit proximate to a meshing of the meshing gears at which proximal portions of the first and second curved sections meet and defining a first jetting interior channel fluidly communicative with the main interior channel and terminating at the summit, and the second lube jet section comprising an elongate member extending toward a bearing of one of the meshing gears from one of the first and second curved sections and defining a second jetting interior channel fluidly communicative with the main interior channel and terminating at a distal end of the elongate member.

10. The gearbox according to claim 9, wherein the first and second curved sections have respective curvatures that conform to curvatures of the meshing gears.

11. The gearbox according to claim 9 wherein the main interior channel is chargeable with lubricant whereby the lubricant is communicated into and through the at least one of the first and second jetting interior channels.

12. The gearbox according to claim 11, wherein:
the first lube jet section defines an inwardly facing aperture at the summit at which the first jetting interior channel terminates, and the lubricant is communicated into and through the first jetting interior channel at sufficient pressure to form a longitudinal lubricant jet that impinges on the meshing of the meshing gears upon exiting the inwardly facing aperture.

13. The gearbox according to claim 11, wherein:
the second lube jet section defines a laterally facing aperture at the distal end at which the second jetting interior channel terminates, and the lubricant is communicated into and through the second jetting interior channel at sufficient pressure to form a sidelong lubricant jet that impinges on the bearing of the one of the meshing gears upon exiting the laterally facing aperture.

14. The gearbox according to claim 9, further comprising mountings by which the first and second curved sections are mountable to the housing.

15. The gearbox according to claim 9, further comprising plugs to plug open ends of the main interior channel and the at least one of the first and second jetting interior channels.

16. A shroud forming method for forming the shroud according to claim 1, the shroud forming method comprising:
selecting a gearbox design in which the shroud is to be installed, the gearbox design comprising gears, bearings and rotation shafts of the gears and a housing in which the gears, bearings and rotation shafts are disposed;

identifying space between the housing and the gears, bearings and rotation shafts;

identifying locations of the gears, bearings and rotation shafts at which lubrication is warranted;

designing the shroud for installation within the space such that the shroud comprises a body and the first and second lube jet sections for suppling lubricant to the locations integrated with the body; and assembling the shroud such that the body and the lube jet sections define interior channels for the lubricant.

17. The shroud forming method according to claim 16, further comprising:
mounting the shroud to the housing; and charging the interior channels with the lubricant.

18. The shroud forming method according to claim 16, wherein the assembling of the shroud comprises additive manufacturing.

19. The shroud forming method according to claim 16, wherein the assembling of the shroud comprises one of casting and brazing.

20. The shroud forming method according to claim 19, wherein the assembling of the shroud further comprises:
drilling the interior channels; and plugging open ends of the interior channels.

* * * * *